United States Patent
Schromm et al.

(10) Patent No.: US 8,349,229 B2
(45) Date of Patent: Jan. 8, 2013

(54) METHOD AND DROP FORMER FOR PRODUCING TABLETS AND METHOD FOR PRODUCING A SULFUROUS FERTILIZER

(75) Inventors: Hans-Kurt Schromm, Backnang (DE); Albert Baeder, Waiblingen (DE); Matthias Kleinhans, Waiblingen (DE)

(73) Assignee: Sandvik Materials Technology Deutschland GmbH, Duesseldorf (DE)

( * ) Notice: Subject to any disclaimer, the term of this patent is extended or adjusted under 35 U.S.C. 154(b) by 296 days.

(21) Appl. No.: 12/734,940

(22) PCT Filed: Dec. 3, 2008

(86) PCT No.: PCT/EP2008/010222
§ 371 (c)(1),
(2), (4) Date: Jun. 2, 2010

(87) PCT Pub. No.: WO2009/074250
PCT Pub. Date: Jun. 18, 2009

(65) Prior Publication Data
US 2010/0288005 A1      Nov. 18, 2010

(30) Foreign Application Priority Data
Dec. 11, 2007   (DE) .......................... 10 2007 061 408

(51) Int. Cl.
*B29B 9/10*       (2006.01)
(52) U.S. Cl. ............. 264/8; 264/9; 264/13; 425/6; 425/8
(58) Field of Classification Search ........................ None
See application file for complete search history.

(56) References Cited

U.S. PATENT DOCUMENTS

| | | | |
|---|---|---|---|
| 3,369,885 | A | 2/1968 | Takahashi et al. |
| 4,330,319 | A | 5/1982 | Bexton et al. |
| 4,383,855 | A | 5/1983 | Aaron et al. |
| 5,326,164 | A | 7/1994 | Logan |
| 5,401,938 | A * | 3/1995 | Froeschke et al. ............ 219/602 |

(Continued)

FOREIGN PATENT DOCUMENTS

CA      2 142 832      1/1995

(Continued)

OTHER PUBLICATIONS

German Patent Office Search Report issued in DE 10 2007 061 408.1 dated Nov. 4, 2008 (4 pages) and English.

(Continued)

*Primary Examiner* — Mary F Theisen
(74) *Attorney, Agent, or Firm* — Flynn, Thiel, Boutell & Tanis, P.C.

(57) ABSTRACT

A method for producing tables made of mixtures of a plurality of materials, and a method for producing a sulfurous fertilizer. A method for producing tablets made of mixtures of a plurality of materials, particularly urea mixtures, having the following steps:—producing a liquid melt of a first material,—adding at least one further material in solid or liquid form to the melt for producing a mixture,—output of drops of the mixture onto a steel belt by means of a drop former having a rotating, perforated outer drum,—solidification of the drops of the mixture on the steel belt into tablets, wherein the at least one additional material is mixed into the liquid melt in liquid form immediately before the drop former or into the liquid melt in solid. form upstream of a two-stage heated grinding and mixing unit.

12 Claims, 4 Drawing Sheets

U.S. PATENT DOCUMENTS

| | | | |
|---|---|---|---|
| 5,439,288 A | | 8/1995 | Hoffman et al. |
| 5,571,303 A | | 11/1996 | Bexton |
| 5,591,458 A | * | 1/1997 | Froeschke et al. ............... 425/6 |
| 5,770,235 A | * | 6/1998 | Baumann et al. ............... 425/8 |
| 5,782,951 A | | 7/1998 | Aylen et al. |
| 5,858,957 A | * | 1/1999 | Donoghue et al. ............ 510/445 |
| 6,162,036 A | * | 12/2000 | Froeschke ...................... 425/6 |
| 6,179,893 B1 | | 1/2001 | Bendix et al. |
| 6,398,989 B1 | * | 6/2002 | Bergstrom ...................... 264/8 |
| 7,344,368 B2 | * | 3/2008 | Gierke et al. .................. 425/8 |
| 7,700,012 B2 | | 4/2010 | Van Der Werf et al. |
| 2002/0045727 A1 | | 4/2002 | Weyer et al. |
| 2003/0047224 A1 | | 3/2003 | Cohen et al. |
| 2003/0099733 A1 | * | 5/2003 | Lumley et al. .................. 425/8 |
| 2005/0158416 A1 | | 7/2005 | Kleinhans et al. |
| 2007/0131381 A1 | | 6/2007 | Schermutzki et al. |
| 2009/0084149 A1 | | 4/2009 | Van Der Werf et al. |

FOREIGN PATENT DOCUMENTS

| | | |
|---|---|---|
| CA | 2 322 629 A1 | 9/1999 |
| DE | 31 24 200 A1 | 1/1983 |
| DE | 43 22 629 C1 | 8/1994 |
| DE | 195 27 067 C1 | 12/1996 |
| DE | 198 09 242 A1 | 9/1999 |
| DE | 198 26 570 A1 | 12/1999 |
| DE | 10 2004 009 709 A1 | 9/2005 |
| DE | 10 2005 054 462 A1 | 5/2007 |
| EP | 1 195 365 A1 | 4/2002 |
| ES | 2 187 220 | 5/2003 |
| GB | 1 389 821 | 4/1975 |
| WO | WO 96/27571 A1 | 9/1996 |
| WO | WO 03/011446 A1 | 2/2003 |
| WO | WO 03/022451 A1 | 3/2003 |
| WO | WO 2006/111331 A1 | 10/2006 |

OTHER PUBLICATIONS

English translation of International Preliminary Report on Patentability issued in PCT/EP2008/010222 dated Jul. 6, 2010 (11 pages).
Form PCT/ISA/210 dated Sep. 10, 2009 (10 pages).
Form PCT/ISA/220 dated Sep. 10, 2009 (3 pages).
Form PCT/ISA/237 (11 pages).

* cited by examiner

METHOD AND DROP FORMER FOR PRODUCING TABLETS AND METHOD FOR PRODUCING A SULFUROUS FERTILIZER

FIELD OF THE INVENTION

The invention relates to a method for producing tablets of mixtures of a plurality of substances, in particular urea mixtures. The invention also relates to a drop former for producing tablets from mixtures of a plurality of substances, in particular urea mixtures. The invention further relates to a method for producing a sulfurous fertilizer.

BACKGROUND OF THE INVENTION

A method is known for the production of urea tablets from the international patent publication WO 2006/111331A1. A urea melt is thereby fed to a drop former that has a perforated rotating outer drum. The urea melt is forced through the outer drum and falls drop-wise on to a cooled steel belt. During further transport by the steel belt the urea melt drops cool down and can be removed at the end of the belt as solidified tablets. The urea melt can be substantially comprised of pure urea or have additives added and/or be mixed with other substances.

A problem that can arise with the production of tablets comprising mixtures of a plurality of substances is the reliable and intimate mixture of the different substances. A uniform and intimate mixing of the substances of the mixtures is of particular importance since a uniform distribution of the substances should be achieved even within very small tablets to ensure that the product quality is consistent.

SUMMARY OF THE INVENTION

The aim of the invention is to provide a method and a device for the production of tablets from mixtures of a plurality of substances, through which a consistent substance composition of the tablets can be ensured.

In accordance with the invention a method is provided for the production of tablets from mixtures of a plurality of substances, in particular urea mixtures, with the following steps: production of a liquid melt of a first substance, addition of at least one further substance in solid or liquid form to the melt to yield a mixture, deposition of drops of the mixture onto a steel belt through a drop former with a rotating perforated outer drum, solidification of the drops of the mixture on the steel belt to form tablets, wherein the minimum of one further substance in liquid form is added to the liquid melt immediately before the drop former or in solid form is mixed in with the liquid melt upstream of a two-stage heated grinding and mixing unit.

It has been found, in particular with the production of urea mixtures and the tableting of such urea mixtures, that additives in liquid form should be added to the liquid melt, especially the urea melt, immediately before entry to the drop former. Addition immediately before entry to the drop former prevents separation of the liquid melt of the first substance from the further added liquid substance upon transport to the drop former, for instance as a result of different specific weights. The addition of the further liquid substance immediately before entry to the drop former enables a liquid that is intimately and uniformly mixed to be deposited over the whole width of the drop former on the cooled steel belt as drops. If, however, solid additives are to be added to the liquid melt then the use of a two-stage heated grinding and mixing unit has been found to be extremely advantageous to bring about a uniform and intimate mixing of the originally solid further substance and the liquid melt of the first substance. For the addition of further substances originally in solid form, the repeat grinding and mixing process in adequate units is required to ensure a uniform small particle size as well as uniform mixing. In the case of urea tablets or tablets of mixtures of urea and further substances in particular, the particle size in the final mixture produced should have a grain diameter of less than 250 µm, especially 100 µm. Such a grain diameter is suitable for good dispersion and subsequent tableting. The originally solid further substances may remain in the form of solids or may in part or in full be liquefied, for instance through melting or dissolution.

The first substance is advantageously urea and the further substance is ammonium sulfate, nitrogen, phosphorous, potassium, sulfur or wax. A plurality of further substances may also be mixed with the urea, for instance mixtures of the aforementioned substances and further additives. The mixture advantageously contains at least 30% urea. The mixture can contain between 5% and 20% sulfur. The mixture can contain between 20% and 60% ammonium sulfate. The mixture can also contain between 2% and 5% wax, zinc or other additives. Mixtures of urea with sulfur or ammonium sulfate in particular have been found to be especially advantageous for the production of fertilizer. The method according to the invention allows urea and sulfur or urea and ammonium sulfate to be mixed together without the addition of additives. Additives are required in conventional processes to stabilize mixtures of sulfur and urea so that there is no separation during processing. Fatty acids, for example, are used to stabilize such suspensions.

The mixture is advantageously subjected to ultrasonic sound immediately upstream of the drop former or within the drop former.

In this way an intimate and uniform mixture of a plurality of substances is obtained immediately before entry to the drop former, so that the tablets produced have an extremely uniform material composition. With mixing of two liquids in particular, a homogeneous mixture is not always possible because of their physical properties. With the method according to the invention the liquids are atomized to very small particles through the ultrasonic waves and can be homogenously mixed together. The method according to the invention can be used in an especially advantageous manner for mixing two liquids, for instance for mixing a urea melt with one or more liquid additives. But also when solid particles are added to the liquid urea melt, then these substances are firstly highly comminuted through the two-stage grinding and mixing process and secondly are themselves melted where necessary. The use of ultrasonic radiation will in all cases ensure a uniform and intimate mixing process, also when mixing solid particles of small size with a melt, in particular a urea melt. Extremely advantageous effects can be achieved through the use of ultrasonic radiation for mixing elementary sulfur and urea. Subjection to ultrasonic radiation comminutes the liquid elementary sulfur into very fine particles, in particular with a particle size of between 1 µm and 10 µm. In the same way the liquid urea is also comminuted into very fine particles. Urea and elementary sulfur can thereby be intimately mixed, and above all without the addition of additives. With the method according to the invention the intimate mixing between urea and elementary sulfur can be maintained until drops are formed which are then deposited on the cooled steel belt and solidify to form tablets. A further advantage of the use of ultrasonic radiation for elementary sulfur and the resultant comminution of the sulfur into very fine particles between 1 µm and 10 µm in size is that elementary sulfur can be used as a fertilizer in latitudes with moderate climates. The use of sulfur as a fertilizer and the use of mixtures of urea and sulfur is known, but a problem here is that plants are only able to assimilate sulfate but not elementary sulfur. For this reason sulfur is generally converted in complex processes into sulfate, for instance ammonium sulfate. Certain bacteria, for example thiobacillus or acidianus, oxidize elementary sulfur with oxygen to sulfate. Under natural conditions this is a very long process and is dependent on temperature and the moisture level of the surroundings. The comminution of the sulfur, by subjecting it to ultrasonic radiation according to the invention, to particle sizes between 1 µm and 10 µm yields an enormous increase in its surface area, which offers a greater area for the bacteria to act on and accelerates biological oxidation.

In an advantageous manner the mixture is subjected to ultrasonic radiation within a feed channel of the drop former that lies immediately upstream of the rotating outer drum or inside the rotating outer drum.

The arrangement of the ultrasonic generator within a feed channel of the drop former can ensure that the mixture is still intimately and uniformly mixed at the time of discharge through the openings of the perforated outer drum and therefore at the time the tablets are formed. The ultrasonic transmitter, for instance a so-called ultrasonic sonotrode, may be arranged in the feed channel within the rotating outer drum.

In a further embodiment of the invention the mixture within the drop former is mixed by means of an agitator device within the drop former up to immediately before discharge through nozzles and openings of the rotating outer drum.

The provision of a mechanical agitator device is of considerable advantage, in particular for the mixing of a melt with solid particles. The provision of an agitator device within the drop former, i.e., immediately before discharge through the nozzles of the drop former and the perforated outer drum of the drop former, can prevent sinking or sedimentation of solid particles within the melt.

The mixture is advantageously stirred within a feed channel of the drop former, which is arranged within the rotating outer drum.

This enables a uniform and intimate mixing process across the entire width of the outer drum.

In a further embodiment of the invention the drop former and the piping leading to the drop former are heated for the first substance and the at least one further substance.

This prevents, for instance, a urea melt, or salts that are used as additives, from crystallizing out during the feed to the drop former, even over longer transport paths. Pumps and/or grinding and mixing units lying upstream of the drop former are also advantageously heated.

The aim of the invention is also solved through a device for the production of tablets from mixtures of a plurality of substances, in particular urea mixtures, with a drop former, in which a rotating perforated outer drum above the circumferential steel belt and a feed channel for the mixtures to be tabletted is arranged in the outer drum, with at least one ultrasonic oscillator arranged in the feed channel.

The provision of an ultrasonic oscillator in the feed channel can ensure the intimate and uniform mixing of a plurality of substances. This applies in particular when substances that are poorly miscible are to be processed together, for instance liquids that cannot be homogeneously mixed because of their physical properties. For example, they may be liquids of different densities that then separate again spontaneously. The provision of an ultrasonic oscillator in the feed channel ensures that the liquids are atomized into very fine particles through the ultrasonic waves emitted and are therefore uniformly and intimately mixed.

In a further embodiment of the invention the minimum of one ultrasonic oscillator is arranged directly upstream of the outer drum and/or within the outer drum in the feed channel. The ultrasonic sonotrode operates, for example, at a frequency of 24 kHz with an output of 400 W. The vibrating rod of the ultrasonic sonotrode extends, for example, over a distance of 100 mm into the feed channel.

In a further embodiment of the invention the ultrasonic oscillator has a vibrating rod that is arranged concentrically to the feed channel and extends into that channel, so that an annular gap is formed between an inner wall of the feed channel and the vibrating rod.

It has been found that the formation of such an annular gap between the vibrating rod and the inner wall of the feed channel can ensure a reliable and intimate mixing of a plurality of substances.

A feed line for the mixtures advantageously opens in the region of the annular gap into the feed channel.

In this arrangement the entire mixture has to pass through the annular gap and whilst it is flowing through the annular gap it is subject to ultrasonic waves so that the different substances present in the mixture are atomized and as a result intimately mixed with one another.

The aim of the invention is solved through a device for the production of tablets from mixtures of a plurality of substances, in particular urea mixtures, with a drop former, with a rotating perforated outer drum above a circumferential steel belt and a feed channel for the mixtures to be tabletted extending into the outer drum, with an agitator device arranged in the feed channel.

The provision of an agitator device within the feed channel can ensure that the substances to be mixed are mixed up to immediately before their discharge through nozzles of the drop former and the openings of the rotating, perforated outer drum. Even substances that are poorly miscible can thereby be uniformly mixed within the feed channel and drops can be discharged with a uniform material composition over the entire width of the drop former. The agitator device can be provided as an alternative to, or in addition to, the ultrasonic oscillator.

In a further embodiment of the invention a motor is arranged at one free end of the feed channel and is provided to drive the agitator device.

In a further embodiment of the invention the agitator device has a helix that can be rotated within the feed channel.

A helix that is arranged within the feed channel such that it can rotate can ensure uniform mixing over the entire length of the feed channel. The substances to be mixed are thereby held in motion over the entire length of the feed channel and, for instance, the sedimentation of solid particles or the separation of liquids that are not readily miscible can be prevented.

In a further embodiment of the invention a motor drive shaft and the helix are arranged aligned to one another and coupled in an essentially rotationally-fixed manner.

This arrangement yields a comparatively simple and reliable design. In particular a space-saving design is achieved.

In a further embodiment of the invention the agitator device has a rotatable helix arranged within the feed channel, wherein the longitudinal edges of the helix are held at a small distance from the inner wall of the feed channel.

This arrangement prevents the rapid wear of the feed channel. The distance between the inner wall of the feed channel and the longitudinal edges of the helix is chosen to be so small that no dead zone can result with poorly-mixed substances within the feed channel.

The helix is advantageously provided with a plurality of spacers, arranged vertically and centrally on the helix, the free ends of which lie against the inner wall of the feed channel.

It was surprisingly found that the use of such spacers, for instance in the form of plastic bolts rounded at their free ends, can hold very long, and in no way torsionally-rigid, helix reliably at a distance from the inner wall of the feed channel. This allows a rotating helix to be realized within the feed channel and over the entire width of the feed channel even for long lengths of helix and with feed channels that have a small cross-section.

The spacers are advantageously arranged at a distance from one another in the longitudinal direction of the helix such that they are on helix sections that are turned through 90° to one another.

The helix can be reliably supported in this way and the spacers can be formed in a very simple manner as bolts mounted on the helix.

In a further embodiment of the invention the helix is in the form of a strip of material that is turned about its longitudinal axis.

For instance a coiled stainless steel strip can be used. The poor bending stiffness of such a stainless steel strip is not a problem since the use of the spacers ensures that the helix does not come into contact with the inner wall of the feed channel. Even with feed channels that have a small cross-section a helix can be used that can extend through a narrow feed channel with a diameter of approximately 30 mm over a length of up to one meter, without it being a disrupting obstacle to flow.

The invention also relates to a method for the production of a sulfur-containing fertilizer, in which the following steps are envisaged: Production of a melt containing elementary sulfur, subjection of the melt containing elementary sulfur to ultrasonic sound and tableting of the melt containing elementary sulfur.

It was surprisingly found that through the production of a melt containing elementary sulfur and subjection of this melt to ultrasonic sound, elementary sulfur can be comminuted to very small particles with a particle size between 1 μm and 10 μm. If the sound power level is appropriately chosen, for instance at a frequency of 24 kHz and an output of approximately 400 W, then at least a large percentage of the sulfur particles in the melt will be in such a size range. The use of sulfur as a fertilizer is known, and it is also known that plants are unable to take up elementary sulfur, they can only take up sulfate as a nutrient. For this reason, sulfur to be used for the manufacture of fertilizer is converted in complex processes to sulfate, for instance ammonium sulfate, and such sulfate is then used as a fertilizer or in fertilizer mixtures. The transformation of elementary sulfur into sulfate is, however, also possible in nature since certain types of bacteria, such as thiobacillus or acidianus, can oxidize elementary sulfur with oxygen to form sulfate. This process is a very long one under natural conditions and is dependent on the temperature and moisture content of the environment. The comminution of the sulfur to particle sizes between 1 μm and 10 μm yields an enormous increase in the surface area, which offers a greater area for the bacteria to act on and as a result accelerates biological oxidation. The method according to the invention for the production of fertilizer containing sulfur therefore has the decisive advantage that elementary sulfur can be used directly as a fertilizer in moderate latitudes in which the natural conversion of sulfur to sulfate would occur very slowly.

In a further embodiment of the invention a melt of elementary sulfur and urea is produced.

Mixtures of urea and elementary sulfur are very suitable for use as fertilizers. The method according to the invention, in which the melt is subject to ultrasonic sound so that both the elementary sulfur and urea are comminuted into very small particles, further has the advantage that the small particle sizes enable a very intimate and uniform mixing of the urea and sulfur. Upon subsequent tableting of such a mixture it can therefore be ensured that even small tablets have a consistent mix ratio over a long production period. In particular, it is possible to mix elementary sulfur and urea without the use of any additives, and even if sulfur and urea are used exclusively as the mixture partners no additional substances, such as fatty acids, are needed to stabilize the resultant mixture, in particular a suspension. The comminution of sulfur and urea into very small particles through the use of ultrasonic sound enables a homogeneous mixture of urea and sulfur to be maintained until such time as the mixture is tableted. As soon as the mixture is discharged in drop form onto a cooled steel belt then the solidification process to form tablets commences and separation can no longer take place.

BRIEF DESCRIPTION OF THE DRAWINGS

Further characteristics and advantages of the invention are derived from the claims and the following description of preferred embodiments of the invention in association with the drawings. Individual characteristics of the different embodiments can be combined with one another in any desired way without exceeding the framework of the invention. The Figures are as follows:

DETAILED DESCRIPTION

Figure 1:
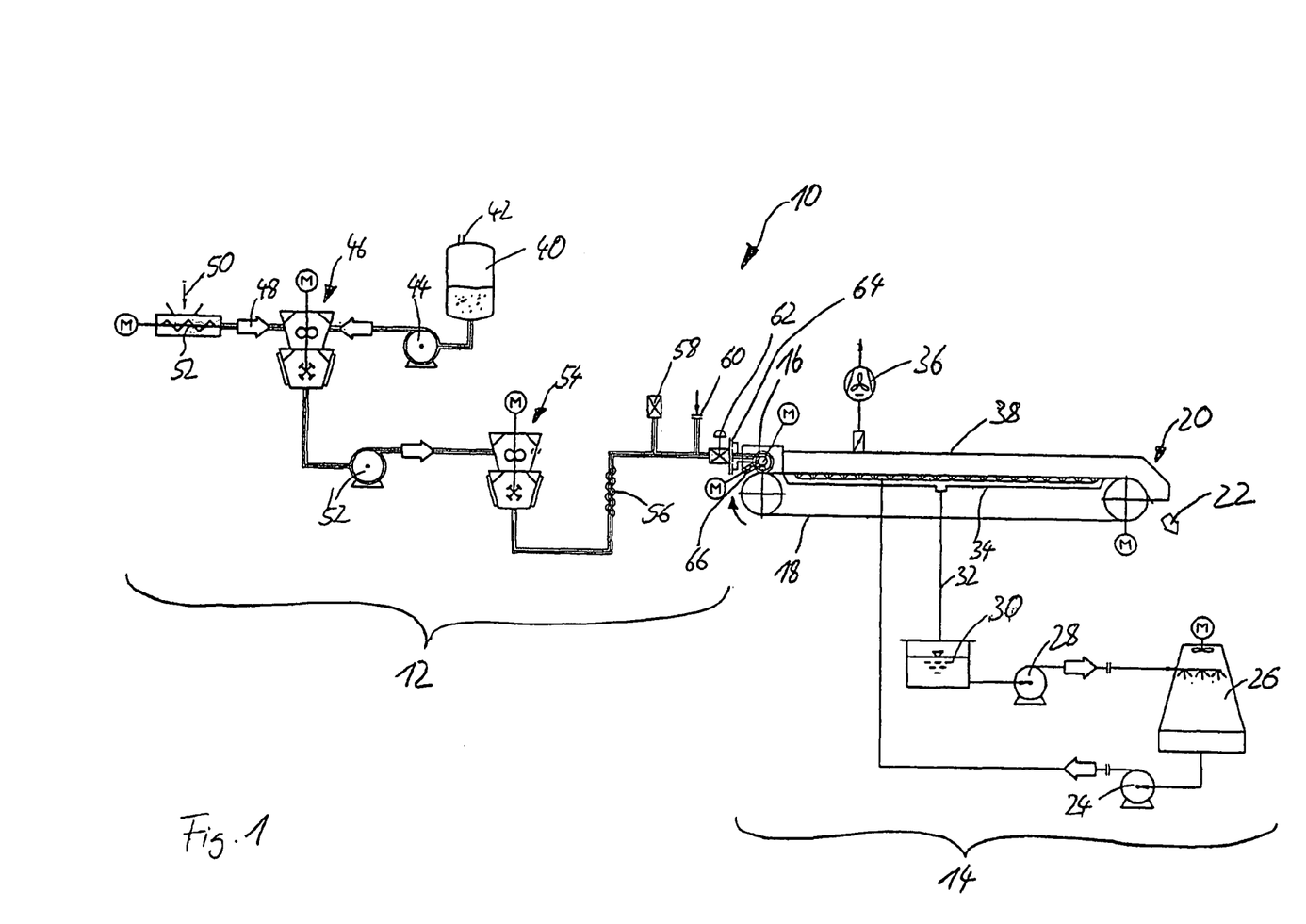
FIG. 1 schematic representation of a tableting device according to the invention for the production of a mixture of at least two substances and for tableting of this mixture in a drop former FIG. 2 sectional view of a drop former in accordance with a first embodiment of the invention FIG. 3 sectional view of a drop former in accordance with a second embodiment of the invention FIG. 4 partially sectional and enlarged view of a further drop former in accordance with a third embodiment of the invention

FIG. 1 shows a tableting device 10, in which a mixture of a urea melt with at least one further additional substance or additive is produced in a first section designated 12. A second section, designated by 14, of the tableting device 10 serves for the production of tablets from the mixture produced in section 12. For this purpose section 14 contains a drop former 16 with a rotating perforated outer drum and a feed channel extending within the outer drum. From the feed channel, the fed liquid mixture enters a nozzle manifold that lies against the inner side of the perforated outer drum. The liquid passes through the nozzles and through the openings in the perforated outer drum and falls drop-wise onto a circumferential steel belt 18 arranged below the drop former 16. The steel belt 18 is sprayed from below with cooling liquid in the region of its upper strand so that the material drops deposited on the steel belt 18 during transport solidify into tablets towards the downstream end 20 of the upper strand and can be removed at the downstream end 20. The removal of the finished tablets is indicated by an arrow 22. Spray nozzles are arranged below the upper strand of the steel belt 18 and are fed through a pump 24. A cooling tower 26, in which the cooling water is cooled, is arranged upstream of the pump 24. A pump 28 upstream of the cooling tower 26 pumps cooling water from a collecting vessel 30 to the cooling tower 26. The collecting vessel 30 is connected through a line 32 to a collecting basin 34 that is arranged below the upper strand of the steel belt and in which cooling water dripping from the steel belt is collected.

A fan 36 draws air from a hood 38 which essentially covers the complete upper strand of the steel belt 18. A motor drive, indicated by the letter M is shown at a number of points in FIG. 1. For example, a right deflecting roller for the steel belt 18 shown in FIG. 1 is driven by a motor. Naturally the pumps 24, 28 are also, for example, driven by motors even though this is not explicitly shown.

A urea evaporator 40, in which urea dissolved in water is present, is provided for the production of a urea melt. This liquid is heated, the water evaporates and passes through an outlet 42 as steam. A urea melt results after essentially complete evaporation of the water, with said melt being transported further via heated lines and a pump 44. To prevent cooling of the urea melt and, above all, its crystallization a heating jacket is provided for both the piping which exits the urea evaporator 40 and for the pump 44. The urea melt enters a first grinding and mixing unit 46, to which a further substance is fed in addition to the urea melt, as indicated by an arrow 48. Ammonium sulfate, $(NH_4)_2SO_4$, is used, for example, as a further substance and is fed as a solid to a metering unit 52 as shown by an arrow 50. The ammonium sulfate is present, for example, in the form of granules, so that it can also be transported to the first grinding and metering unit 46. The solid ammonium sulfate, for instance in the form of granules, is initially ground in the first grinding and metering unit 46 and then mixed with the urea melt. The urea melt can also be transported through the grinding unit if desired. The mixture is then transported to a further pump 52 via a heated discharge line and is transported from there to a second grinding and mixing unit 54. In the second grinding and mixing unit 54 the ammonium sulfate particles are comminuted further to a particle diameter of less than 250 μm, in particular less than 100 μm. The use of a two-stage grinding and mixing process, through two grinding and mixing units 46, 54 arranged in series, has been found to be extremely useful and advantageous to mix various different solids with a melt of a first substance, for instance a urea melt, intimately and uniformly. The mixture is transported from the second grinding and mixing unit 54 via a heated line and a heated flexible tube section 56 to the drop former 16.

The drop former 16 is arranged downstream of the flexible tube 56, and in the schematic representation shown in FIG. 1 for clarity purposes the region directly upstream of the drop former 16 is shown in an exploded view. A liquid additive can be metered into the mixture through a device 58 immediately upstream of the drop former 16. A so-called ultrasonic sonotrode 60 is arranged immediately upstream of the drop former 16 so that liquids that are not readily miscible and cannot remain as mixtures for longer periods because of their physical properties can be reliably and intimately mixed. The ultrasonic sonotrode emits ultrasonic waves into the pipe and ensures that the substances to be mixed are atomized into very small particles and as a result uniformly mixed. Since the ultrasonic sonotrode, i.e., an ultrasonic oscillator, is arranged immediately upstream of the drop former 16, the mixing of the various different substances, in particular with liquids, can definitely be ensured up to their discharge through the perforated outer drum of the drop former 16, so that drops of the mixture are deposited on the steel belt 18 that have a very uniform and constant material composition across the different drops.

A shut-off valve is designated by the number 62, and downstream of the shut-off valve 62 is a heating device 64 indicated schematically, which heats the drop former 16 itself and in particular a feed channel within the rotating outer drum. In addition, the drop former 16 has an agitator unit 66 which is driven by a motor and which also ensures an intimate and uniform mixing of the different substances up to immediately before discharge through the rotating outer drum. The ultrasonic sonotrode 60 and the agitator device 66 can be provided at the same time or alternatively.

Figure 2:
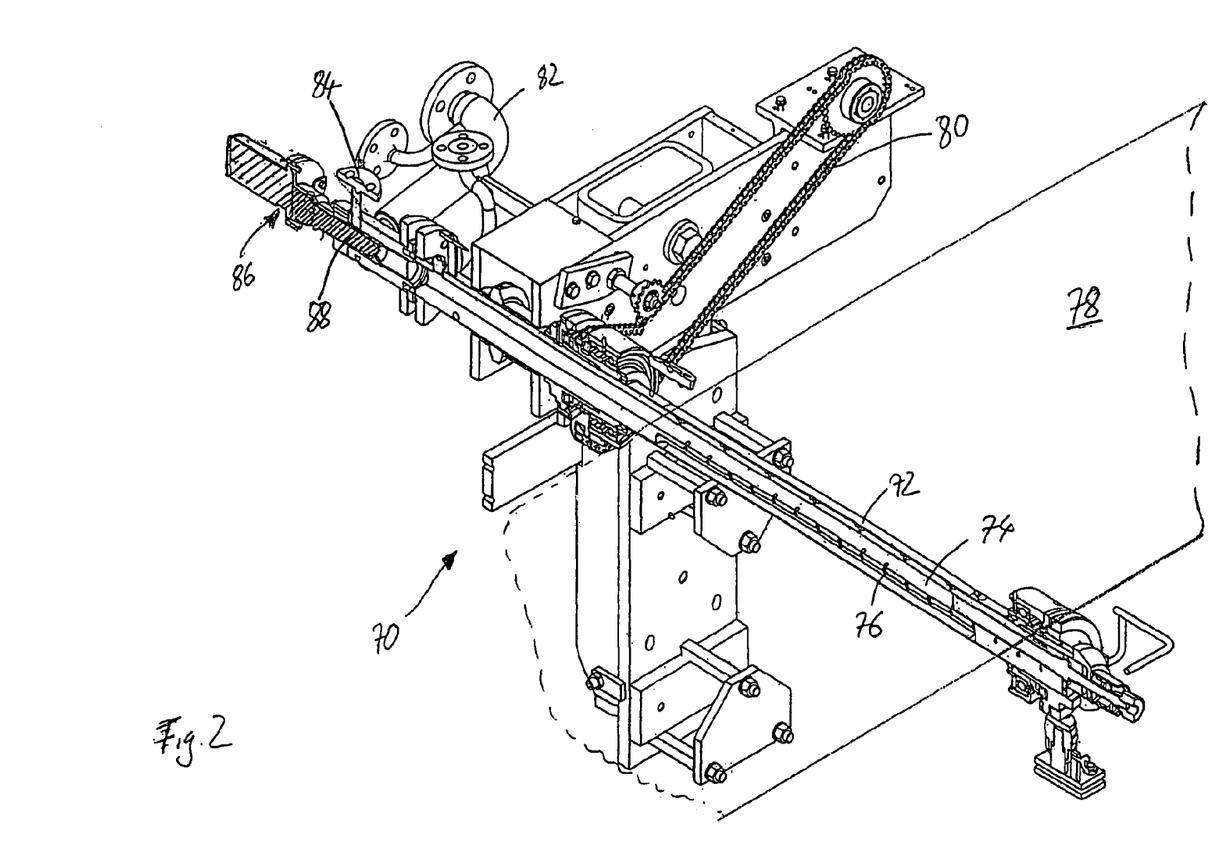

FIG. 2 shows a drop former 70 according to a first embodiment of the invention in more detail. The drop former 70 has a rotating perforated outer drum 72, within which a feed channel 74 and a nozzle manifold 76 are arranged. The nozzle manifold 76 lies against one inner wall of the perforated outer drum 72 and furthermore lies opposite a steel belt 78 that is moved through beneath the drop former 70. Liquid to be converted into drops passes through the feed channel 74 and enters the nozzle manifold 76 and from there is pressed through the openings in the rotating outer drum 72. As soon as the liquid in drop form has passed through the openings in the rotating outer drum 72 the drops are deposited on the steel belt 78. As already explained with reference to FIG. 1, the deposited drops solidify during transport on the steel belt 78 to tablets and can be removed from the belt at its deflection.

It can be seen from FIG. 2 that the rotating outer drum 72 is driven by means of a chain 80 which in turn is driven by a drive motor that is not shown.

The drop former 70 and in particular the feed channel 74, are heated, although for clarity reasons suitable heating devices are not shown in FIG. 2. The urea melt passes via the heated pipe 82 into the feed channel, i. e. the urea melt is introduced into the feed channel in the region of a left end of the feed channel 74 shown in FIG. 2. A liquid additive is also introduced into the feed line 74 via a pipe 84 in the region of this left end of the feed channel 74. An ultrasonic oscillator 86 is provided at this end of the feed channel 74 at which the pipe 82 for the urea melt and the pipe 84 for the liquid additive open to ensure a uniform and intimate mixing of the urea melt and the liquid additive as far as possible. The ultrasonic oscillator 86 has a vibrating rod 88 which extends concentrically into the feed channel 74 so that an annular gap is formed between an inner wall of the feed channel 74 at this end and the outer wall of the vibrating rod 88. Both the urea melt and the liquid additive must pass through this annular gap to enter the further course of the feed channel 74 and in particular to reach the nozzle manifold 76. The urea melt and the liquid additive are exposed to ultrasonic waves whilst they are flowing through this annular gap. Both the urea melt and the liquid additive are comminuted into very small particles through the ultrasonic waves, and these very small particles then mix to form a homogenous mixture. The vibrating rod 88 of the ultrasonic 86 projects for example approximately 10 cm into the front end of the feed channel 74, vibrates at a frequency of approximately 24 kHz and has an output of approximately 400 W. A titanium sonotrode can be advantageously used which has, for example, a diameter of 22 mm and which is inserted in the feed channel of diameter 30 mm. The width of the annular gap is therefore 4 mm.

Figure 3:
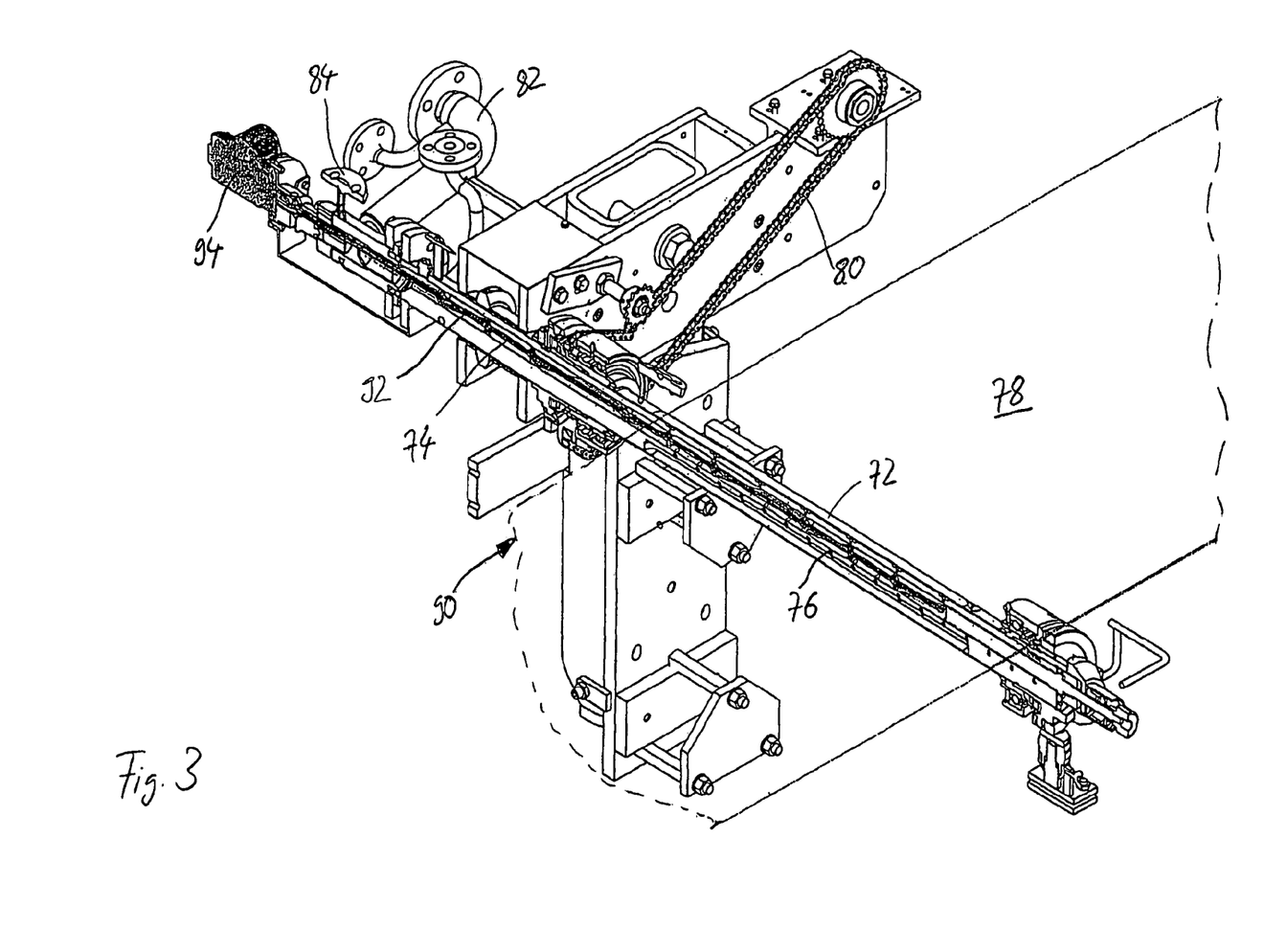

FIG. 3 shows a further embodiment of a drop former 90 in accordance with the invention. The drop former 90 also has a perforated rotating outer drum 72, which is set in rotation through the chain 80 and which is arranged above the steel belt 78. The liquid to be converted into drops passes through the feed channel 74 to the nozzle manifold 76 and, as already described, through the openings in the rotating outer drum 72 and on to the steel belt 78. The drop former 90 in FIG. 3 is in large parts identical to the drop former 70 shown in FIG. 2 and only the differences between the drop former 90 and the drop former 70 will be described in more detail. The drop former 90 has an agitator device in the form of a helix 92 that extends over the entire length of the feed channel 74. The helix is driven at one end by a motor 94 and ensures that liquid in the feed channel 74 is kept continuously in motion up to its discharge through the nozzle manifold 76. Such an agitator device is then particularly advantageous if drops are to be derived from suspensions, for instance a mixture of a urea melt and a further substance, for example ammonium sulfate, that may also have particles with a grain size below 250 µm. The use of the helix 92, which keeps the mixture to be converted into drops in continuous motion, can prevent sedimentation of the particles, for instance as a result of gravity. A mixture of the urea melt and the solid additive, for instance ammonium sulfate, is produced in accordance with the two-stage grinding and mixing process, as described with reference to FIG. 1.

Figure 4:
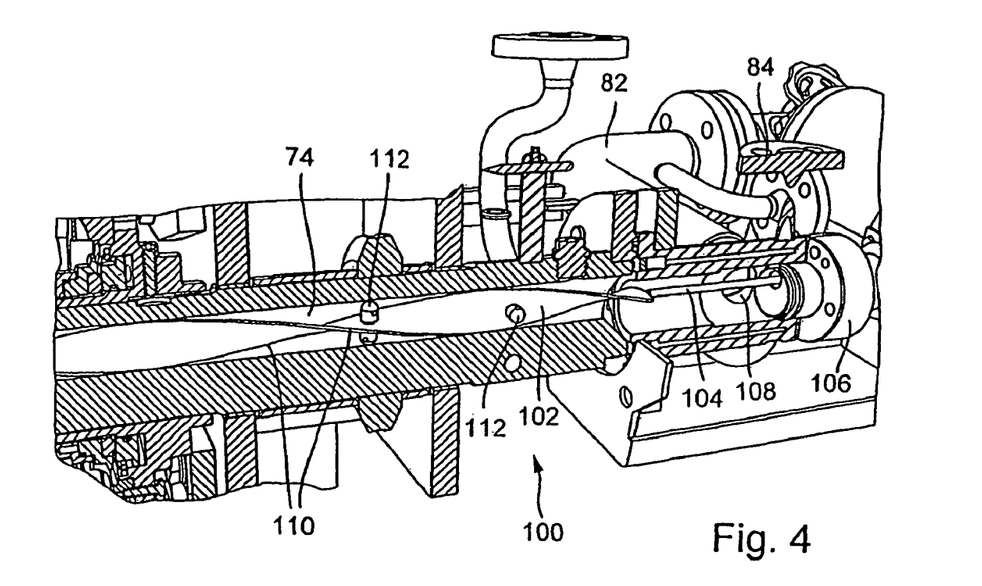

FIG. 4 shows a further embodiment of a drop former 100 that has a very similar design to the drop former 90 in FIG. 3 and differs solely in the design of the helix. The helix 92 in FIG. 3 has a three-dimensional structure whilst the helix 102 of the drop former 100 is in the form of a wound metal strip. It can be readily seen from FIG. 4 that the helix 102 comprises a metal strip that is turned about its longitudinal axis. The right end of the metal strip shown in FIG. 4 is extended through a rod 104 and connected to a drive motor 106 shown only in sections. A drive shaft of the drive motor 106 and a central longitudinal axis of the helix 102, in which the rod 104 also lies, are aligned with one another. An opening 108 of the heated pipe 82 for the urea melt can also be readily seen in FIG. 4. A pipe 84 serves for the feed of a liquid additive, wherein said pipe 84 only opens into the feed channel 74 in the region of the start of the helix 102.

To prevent the possibly sharp longitudinal edges 110 of the helix 102 from coming into direct contact with the wall of the feed channel 74 and from thus damaging it within a short operating period, the helix 102 is provided with a plurality of spacers 112. The spacers are in the form of plastic bolts that project vertically from the helix with rounded free ends. The free rounded ends of these plastic bolts are in contact with the inner wall of the feed channel 74 and ensure that the longitudinal edges 110 of the helix 102 are held at a short distance from the inner wall of the feed channel 74, but do not touch it. As can be seen from FIG. 4, two facing spacers are provided on different sides of the material strip which forms the helix 102. In addition, a plurality of spacers are provided over the length of the helix 102 and the spacers 112 are advantageously arranged in the longitudinal direction of the helix 102 at a distance from one another that they are aligned vertically to one another. A further spacer 112 is therefore arranged after a first spacer 112 after a quarter turn of the helix 102. This allows the helix to be reliably guided in the feed channel 74. As can also be seen in FIG. 4, only two spacers 112 are visible. The torque is applied via the rod 104 in the region of the helix 102 neighboring the drive motor 106 and a compara-
tively high deformation or torsion of the helix 102 is therefore to be expected in this region. In this region the helix 102 therefore also tends to move sideways to a greater degree so that two spacers 112 are arranged displaced at an angle of 90° to one another within a short distance. In the further course of the helix 102 it may therefore be sufficient to have a new spacer only after an entire revolution of the helix 102.

The invention claimed is:

1. A method for production of tablets from mixtures of a plurality of substances comprising:
   producing a liquid melt of a first substance;
   adding at least one further substance in solid or liquid form to the melt to yield a mixture;
   depositing drops of the mixture on to a steel belt through a drop former with a rotating, perforated outer drum; and
   solidifying the drops of the mixture to tablets on the steel belt;
   wherein the at least one further substance in liquid form is mixed in to the liquid melt immediately before the drop former and/or the at least one further substance in solid form is mixed in to the liquid melt upstream of a heated grinding and mixing unit; and
   wherein the mixture within the drop former is agitated up to immediately before a discharge of the mixture through nozzles and openings of the rotating, perforated outer drum by an agitator extending within the drop former.

2. The method according to claim 1, wherein the first substance is urea and the at least one further substance is ammonium sulfate, nitrogen, phosphorous, potassium, sulfur or wax.

3. The method according to claim 2, wherein the ammonium sulfate, nitrogen, phosphorous, potassium, sulfur, wax, and/or mixtures of these substances are mixed to form the mixture.

4. The method according to claim 2, wherein the mixture contains at least 30% urea.

5. The method according to claim 2, wherein the mixture contains between 5% and 20% sulfur.

6. The method according to claim 2, wherein the mixture contains between 20% and 60% ammonium sulfate.

7. The method according to claim 2, wherein the mixture contains between 2% and 5% wax, zinc or other additives.

8. The method according to claim 1, wherein the mixture is subjected to ultrasonic sound immediately upstream of, or within, the drop former.

9. The method according to claim 8, wherein the mixture is subjected to ultrasonic sound within a feed channel of the drop former that lies immediately upstream of the rotating, perforated outer drum or within the rotating, perforated outer drum.

10. The method according to claim 1, wherein the mixture is agitated within a feed channel of the drop former, which is arranged within the rotating, perforated outer drum.

11. The method according to claim 1, wherein the mixture within the drop former and piping leading to the drop former are heated for the first substance and the at least one further substance.

12. The method according to claim 1, wherein pumps and/or the grinding and mixing unit lie upstream of the drop former and are heated.

* * * * *